(12) United States Patent
Bui et al.

(10) Patent No.: US 6,528,613 B1
(45) Date of Patent: Mar. 4, 2003

(54) PHASE CHANGE SOLID IMAGING MATERIAL

(75) Inventors: Loc V. Bui, Valencia, CA (US); My T. Nguyen, Kirland (CA)

(73) Assignee: 3D Systems, Inc., Valencia, CA (US)

( * ) Notice: Subject to any disclaimer, the term of this patent is extended or adjusted under 35 U.S.C. 154(b) by 69 days.

(21) Appl. No.: 09/603,213

(22) Filed: Jun. 26, 2000

Related U.S. Application Data

(62) Division of application No. 09/439,263, filed on Nov. 11, 1999, now Pat. No. 6,133,353.

(51) Int. Cl.[7] .................. C08G 63/44; C08G 18/60
(52) U.S. Cl. ............... 528/288; 528/60; 528/74.5; 528/295.5; 528/335
(58) Field of Search .................. 528/288, 295.5, 528/335, 74.5, 60

(56) References Cited

U.S. PATENT DOCUMENTS

| | | | |
|---|---|---|---|
| 2,409,712 A | 10/1946 | Schweitzer | |
| 3,012,991 A | 12/1961 | Schultheis et al. | |
| 3,653,932 A | 4/1972 | Berry et al. | |
| 3,796,678 A | 3/1974 | Bartizal | |
| 3,963,710 A | 6/1976 | Aufdermarsh, Jr. | |
| 4,011,311 A | 3/1977 | Noomen et al. | |
| 4,293,470 A | 10/1981 | Cuscurida | |
| 4,297,501 A | 10/1981 | Becker et al. | |
| 4,334,032 A | 6/1982 | Patton, Jr. et al. | |
| 4,381,403 A | 4/1983 | Falcone et al. | |
| 4,390,369 A | 6/1983 | Merritt et al. | |
| 4,484,948 A | 11/1984 | Merritt et al. | |
| 4,501,915 A | 2/1985 | McCoy | |
| 4,537,960 A | 8/1985 | Merger et al. | |
| 4,555,357 A | 11/1985 | Kausga et al. | |
| 4,665,146 A | 5/1987 | Tortorello et al. | |
| 4,684,956 A | 8/1987 | Ball | |
| 4,810,820 A | 3/1989 | Slack et al. | |
| 4,830,671 A | 5/1989 | Frihart et al. | |
| 4,851,045 A | 7/1989 | Taniguchi | |
| 4,889,506 A | 12/1989 | Connolly et al. | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,141,749 A | 8/1992 | Herting et al. | |
| 5,151,120 A | 9/1992 | You et al. | |
| 5,162,490 A | 11/1992 | Drawert et al. | |
| 5,195,430 A | 3/1993 | Rise | |
| 5,208,034 A | 5/1993 | Herting et al. | |
| 5,221,335 A | 6/1993 | Williams et al. | |
| 5,286,288 A | 2/1994 | Tobias et al. | |
| 5,302,670 A | * 4/1994 | Frische et al. ........... | 528/295.5 |
| 5,312,889 A | * 5/1994 | Frische et al. ........... | 528/295.5 |
| 5,372,852 A | 12/1994 | Titterington et al. | |
| 5,389,720 A | 2/1995 | Markusch et al. | |
| 5,389,958 A | 2/1995 | Bui et al. | |
| 5,421,868 A | 6/1995 | Ayalia-Esquilin et al. | |
| 5,496,879 A | 3/1996 | Griebel et al. | |
| 5,507,864 A | 4/1996 | Jaeger et al. | |
| 5,527,876 A | * 6/1996 | Kluth et al. ............... | 528/60 |
| 5,574,078 A | 11/1996 | Elwakil | |
| 5,593,486 A | 1/1997 | Oliver et al. | |
| 5,597,856 A | 1/1997 | Yu et al. | |
| 5,607,501 A | 3/1997 | Fujioka | |
| 5,621,022 A | 4/1997 | Jaeger et al. | |
| 5,780,528 A | 7/1998 | Titterington et al. | |
| 5,881,648 A | 3/1999 | Pavlin | |
| 5,902,841 A | 5/1999 | Jaeger et al. | |
| 5,919,839 A | 7/1999 | Titterington et al. | |

FOREIGN PATENT DOCUMENTS

| | | |
|---|---|---|
| DE | 42 05 636 A1 | 8/1993 |
| DE | 42 05 713 A1 | 8/1993 |
| EP | 0 187 352 A2 | 7/1986 |
| EP | 0 206 286 A1 | 12/1986 |
| EP | 0 819 739 A2 | 1/1998 |
| EP | 0 844 287 A1 | 5/1998 |
| EP | 0 869 161 A2 | 10/1998 |
| GB | 2 294 939 A | 5/1996 |
| RU | 438664 | 2/1973 |
| WO | WO 94/04619 | 3/1994 |
| WO | WO 94/14902 | 7/1994 |
| WO | WO 96/02399 | 2/1996 |
| WO | WO 96/02446 | 2/1996 |
| WO | WO 96/10051 | 4/1996 |
| WO | WO 97/12003 | 3/1997 |

OTHER PUBLICATIONS

Mustafin & Magrupov, "Study of the Conditions of the Formation and Certain Furan Oligoamidourethane on the Basis of Furylallyl Alcohol," Collection of the Chemical Technology Dept., Tashkent Polytechnical Institute, Issue 135, 1974, pp. 6–11. (English Translation & Russian Text).

* cited by examiner

*Primary Examiner*—Peter Szekely
(74) *Attorney, Agent, or Firm*—Ralph D'Alessandro

(57) ABSTRACT

A solubilizing agent and a compound made by reacting selected nucleophiles, including fatty acid reactants and amines with an isocyanate are disclosed. The addition of the isocyanate and the different nucleophiles will create a di-urethane tetra-amide solubilizing agent product. The polyamide-solubilizing agent is useful as an ingredient in a phase change solid imaging material and as carrier compositions used to make phase change ink jet inks.

6 Claims, No Drawings

PHASE CHANGE SOLID IMAGING MATERIAL

This application is a divisional of Ser. No. 09/439,263, filed Nov. 11, 1999 and is hereby incorporated by reference in its entirety, now U.S. Pat. No. 6,133,353.

BACKGROUND OF THE INVENTION

1. Field of the Invention

The present invention relates to resins or waxes made by reacting isocyanates with selected nucleophiles such as fatty acid reactants and amines. The nucleophiles are used to achieve certain desirable properties in urethane polyamide resins. The present invention also relates to solid imaging materials used in the rapid prototyping industry, as well as to phase change ink compositions, both generally and in specific compositions, containing such resins and/or waxes. Still further, the present invention relates to the process of using such phase change compositions containing such resins and/or waxes in a printing device.

2. Description of the Relevant Art

In general, phase change materials or inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwert Farbenfabrik Keller, Dr. Rung and Co.

Phase change inks for color printing generally comprise a phase change ink carrier composition which is combined with a phase change ink compatible colorant. Preferably, a colored phase change ink will be formed by combining the above-described ink carrier composition with compatible subtractive primary colorants. Subtractive primary colored phase change inks can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics Ltd. U.S. Pat. No. 5,621,022 assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium, the droplets solidify immediately upon contact with the substrate, migration of ink along the printing medium is prevented and dot quality is improved. More recently, the use of phase change solid imaging material with ink jet print heads has permitted the rapid prototyping and manufacturing industry to increase speed, reduce costs and improve part quality. This is also true of the processes and solid imaging compositions described herein.

In addition to the above-referenced U.S. patents, many other patents describe materials for use in phase change ink jet inks. Some representative examples include U.S. Pat. Nos. 3,653,932; 4,390,369; 4,484,948; 4,684,956; 4,851,045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT patent application WO 94/14902, which was published on Jul. 7, 1994 and is assigned to Coates Brothers PLC, teaches a hot melt ink containing a colorant and, as a vehicle for the hot melt ink an oligourethane having a melting point of at least 65° C. and obtained by reacting an aliphatic or aromatic diisocyanate with at least a stoichiometric amount of either: (I) a monohydric alcohol component; or (ii) a monohydric alcohol component followed by another different alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol [e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (PGBE) and propylene glycol phenyl ether (PPL)]; esterified dihydric aliphatic alcohol [e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot-melt printing], or dihydric polyakylene glycol. This PCT application further defined the dihydric alcohol component as a dihydric aliphatic alcohol or a dihydric polyalkylene glycol [e.g. ethylene glycol, polyethylene glycol (PEG 1500), polypropylene glycol (PPG 750), 1000 and 1500), trimethylene glycol, dipropylene glycol, methylpropanediol and 1.6-hexanediol].

Another PCT patent application, WO 97/12003 also assigned to Coates Brothers PLC, discloses hot melt ink jet base materials that are urethane-amide reaction products obtained from the reaction of isocyanates with one or more functional amides. The urethane-amides are intended to have improved compatibility with viscosity modifying additives.

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

There is still a need for new materials for novel and different applications of phase change materials. There is also a need for relatively low viscosity resins, including nonpolymeric resins, and waxes designed for phase change ink jet and other forms of phase change material printing and rapid prototyping applications. These needs are solved by the present invention by providing a means to create a solubilizing agent that is an isocyanate-derived material for specific applications.

BRIEF SUMMARY OF THE INVENTION

It is an aspect of the present invention that a urethane compound comprising the reaction product of selected isocyanates with selected fatty acid reactants and selected amines are obtained.

It is another aspect of the present invention that a urethane compound comprising the reaction product of selected isocyanates with selected amines or mixtures of selected amines and fatty acid reactant are obtained.

It is still another aspect of the present invention that a phase change solid imaging material or a phase change ink carrier composition which is an admixture of a viscosity modifying agent, a tackifier, a urethane polyamide compound, and a polyamide resin is obtained.

It is still a further aspect of the present invention that a phase change ink composition comprising an admixture of (a) a phase change carrier composition containing at least one isocyanate-derived resin or wax, and (b) a phase change ink compatible colorant is obtained.

It is a feature of the present invention that the amide isocyanate derived resin product of the selected isocyanates with selected fatty acid reactants and selected amines or mixtures of selected amines obviates the need for the use of a separate plasticizer when the resin is employed in a solid imaging material or polyamide ink formulation because the resulting material or ink is sufficiently malleable and ductile on its own.

It is an advantage of the present invention that the isocyanate-derived resins can be design engineered to obtain desired properties for specific printing or rapid prototyping platforms and architectures.

It is another advantage of the present invention that the amide isocyanate-derived resins are very pure, being free of salts and other insoluble contaminants.

It is still another advantage of the present invention that the amide isocyanate-derived resins can be used in combination with other phase change solid imaging material or polyamide materials to obtain ink compositions and rapid prototyping solid imaging materials that display improved yield stress over prior art ink compositions.

It is yet another advantage of the present invention that the isocyanate-derived resins have low viscosity.

It is yet a further advantage of the present invention that the low viscosity polyamide isocyanate-derived resins permit the use of higher molecular weight polyamide resins in combination with a tackifier and a viscosity modifying agent to form a phase change solid imaging material or phase change ink carrier composition.

These and other aspects, features and advantages are obtained by the use of reaction products of selected isocyanates with selected amines and selected fatty acids to produce amide isocyanate-derived resins suitable for use in phase change solid imaging materials and inks that may be employed in rapid prototyping or printing applications.

DESCRIPTION OF THE PREFERRED EMBODIMENTS

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The term "isocyanate-derived wax" as used in the present specification and claims is defined as any crystalline or semicrystalline waxy material derived from the reaction of a fatty isocyanate with a suitable nucleophile, or the reaction of a fatty nucleophile with a suitable isocyanate, or the reaction of a fatty nucleophile with a fatty isocyanate.

Any suitable reaction condition for making urethane or urea compounds by condensing alcohols and/or amines with isocyanates may be employed in the practice of the present invention. Preferably, the reaction is carried out at elevated temperatures (e.g. about 60° C. to about 160° C.) in the presence of a urethane reaction catalyst such as dibutyltin dilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanate such as isophorone duisocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI See J. H. Saunders and K. C. Frisch's "Polyurethanes Part I, Chemistry" published by Interscience of New York, N.Y. in 1962 and Olin Chemicals' Luxate® IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and $T_g$'s of about −30° C. to about 100° C. The isocyanate-derived waxes from these reactions are generally opaque waxy solids having sharp melting points in the range from about 20° C. to about 130° C. and viscosities of from about 1 cPs to about 25 cPs at 140° C. The isocyanate-derived resins and waxes display properties such that the higher the $T_g$ and the melting point, the higher is the viscosity. While the structural activity relationships are not fully understood, it is known that the $T_g$ of the isocyanate-derived resins is controlled by the proper choice of the mixture of nucleophiles in the reaction as illustrated in Table 1 below. Varying one or more of the readily available commodity chemicals used as chemical precursors will permit custom-tailoring of the properties of the isocyanate-derived resin and wax materials.

Table 1 illustrates the difference in physical properties of resins that can be obtained by mixing both functionality and molecular shape and size.

TABLE 1

Mixtures of Abietic Alcohol and Stearyl Amine, Reacted with IPDI

| Alcohol/Amine Ratio | Tg's/Melting Point/Viscosity |
|---|---|
| 100% Alcohol | 40° C./72–76° C./4079 cPs @ 140° C. |
| 75% Alcohol/25% Amine | 23° C./68–87° C./315 cPs @ 140° C. |
| 62.5% Alcohol/37.5% Amine | 17° C./68–89° C./2759 cPs @ 140° C. |
| 50% Alcohol/50% Amine | 16° C./73–110° C./15.7 cPs @ 140° C. |

Preferred alcohols to react with difunctional and higher isocyanates to make the isocyanate-derived waxes and resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched dodecanols, (n- and branched) hexadecanols, (n- and branched) octadecanols, 3-cyclohexy-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isobomeol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired The preferred alcohols are hydroabietyl alcohol, octylphenol ethoxylate and octadecyl alcohol.

Preferred amines to react with difunctional and higher isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the.like) hexyl amine, (n-, iso-, t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n- and iso-)propyl amines, di(n-, iso-, t-) butyl amine, di(n-, iso-, t-, and the like) pentyl amine, di(n-, iso-, t-, and the like) hexyl amine, di(n-, iso-, t-, and the like) cyclohexyl amine, di(n-, iso-, t-, and the like) heptyl amine, di(n-, iso-, t-, and the like) octyl amine, di(n-; iso-, t-, and the like) decyl amine, di(n-, iso-, t-, and the like) dodecyl amine, di(n-, iso-, t-, and the like) octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex.; 3,3'-diamino-N-methyldipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the isocyanate-derived waxes and resins of this invention include any monohydric alcohol. For instance, the monohydric alcohol could be any aliphatic alcohol [e-g., a $C_1$–C2 or higher linear alcohol, any branched alcohol or any cyclic aliphatic alcohol such as methanol, ethanol, (n- and iso-) propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabictyl alcohol, cholesterol, vitamin E and the like) and other suitable alcohols (e.g., N,N-dimethyl-N-ethanolamine, stearamide-monoethanolamine, tripropyleneglycol monomethylether, hydroxybutanone, menthol, isobomeol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW←3000), polypropylene glycol (MW←3000), polyester polyols (MW←3000), polyethylene glycol (MW←3000), pentaerytritol, triehanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is octadecanols.

Preferred amines to react with monofunctional isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-) propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-) propyl amine, di(n-, iso-, t-) butyl amine, di(n-, iso-, t-, and the like) pentyl amine, di(n-, iso-, t-, and the like) hexyl amine, di(n-, iso-, t-, and the like) cyclohexyl amine, di(n-, iso-, t-, and the like) heptyl amine, di(n-, iso-, t-, and the like) octyl amine, di(n-, iso-, t-, and the like) decyl amine, di(n-, iso-, t-, and the like) octadecyl amine, di(n-, iso-, t-, and the like) dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1,12-dodecanediamine; 3-dimethylaminopropylamine; 4,7,10-trioxa-1,13-tridecanediamine; diethylene triamine; 3,3-diamino-N-methyldipropylamine; tris(2-aminoethyl)amine, and the like. The preferred amine is octadecylamine. In solid imaging applications mono-amines, such as 2-hydroxy ethylamine, and diamines, such as ethylenediamine, 1,3-propylenediamine; 2-butyl-2 ethyl-1,5-pentylenediamine; and 1,2-diaminocyclohexane are especially useful.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally amides or other nucleophile containing compounds can be reacted with the isocyanates (mono, di, and the like). Some examples include: urea, oleamide, stearamide, or the like.

Preferred precursors to the isocyanate-derived resins and waxes of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-methoxyphenyl isocyanate; 3-methoxyphenyl isocyanate; 4-methoxyphenylisocyanate; ethyl 4-isocyanatobenzoate; 2,6-dimethylphenylisocyanate; 1-naphthylisocyanate; (naphthyl) ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H.sub.12 MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-hexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Phase change materials of this invention contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change inks and solid imaging material of the current invention incorporate isocyanate-derived waxes and isocyanate-derived resins as all or as part of the carrier composition or imaging material and can be a supplemental ingredient or supplemental ingredients to what is currently available as the existing phase change carrier or imaging material composition. The isocyanate-derived materials of the current invention are tailored to have the desirable properties mentioned above when used in the carrier composition of the inks or in the solid imaging material of the present invention by varying one or more of the readily available commodity chemical precursors.

The phase change carrier compositions or solid imaging material compositions of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. Pat. No. 5,621,022, and/or pigments. They may also be used in combination with the isocyanate-derived colored resins of U.S. Pat. No. 5,780,528 to produce a phase change ink.

Prior art phase change inks for use in direct and indirect transfer printing systems from which the carrier compositions may be useful in solid imaging applications are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. A preferred mono-amide is stearyl stearamide. A preferred tackifier resin is a glycerol ester of hydrogenated abietic (rosin) acid and a preferred antioxidant is that provided by Uniroyal Chemical Company under the tradename Naugard 524. The isocyanate-derived resins and/or isocyanate-derived waxes of the present invention replace one or more of the ingredients in the above phase change ink carrier composition, or the inks or solid imaging materials can have all of the above ingredients replaced by the isocyanate-derived resins and/or waxes of the present invention. One desirable characteristic of the formulations used in solid imaging for rapid prototyping and manufacturing applications is a high yield stress which provides toughness, as opposed to the low yield stress desired for formulations used in ink carrier compositions where flexibility is required.

Suitable classes of tackifiers that may be employed, especially with solid imaging materials include rosin ester, rosin carbamate, glycerin rosin ester, hydrogenated pentaerythritol ester, hydrogenated glycerin ester, modified tall oil rosin, polymerized rosin, aromatic hydrocarbon rosin, and aliphatic hydrocarbon rosin. Preferred tackifiers, especially with solid imaging materials, include butyl [3-({[(7-isopropyl-1,4a-dimethyltetradecahydro-1-phenanthrenyl)methoxy]carbonyl}amino)-1,4,4-trimethylcyclohexyl] methyl carbamate; hexyl [3-({[(7-isopropyl-1,4a-dimethyltetradecahydro-1-phenanthrenyl)methoxy]carbonyl}amino)-1,4,4-trimethylcyclohexyl]methyl carbamate; octyl [3-({[(7-isopropyl-1,4a-dimethyltetradecahydro-1-phenanthrenyl)methoxy]carbonyl}amino)-1,4,4-trimethylcyclohexyl]methyl carbamate; dodecyl [3-( {[(7-isopropyl-1,4a-dimethyltetradecahydro-1-phenanthrenyl)methoxy]carbonyl}amino)-1,4,4-trimethylcyclohexyl]methyl carbamate; and octadecyl [3-({[(7-isopropyl-1,4a-dimethyltetradecahydro-1-phenanthrenyl)methoxy]carbonyl}amino)-1,4,4-trimethylcyclohexyl]methyl carbamate.

Suitable viscosity modifiers or viscosity modifying agents in solid imaging materials include urethane wax, amide wax, alkyl wax and combinations thereof. A preferred viscosity modifying agent is a linear alkyl urethane or carbamate. The linear alkyl carbamate is selected from the group consisting of octadecyl octadecyl carbamate; dodecyl octadecyl carbamate; hexadecyl octadecyl carbamate; and hexyl octadecyl carbamate.

The solubilizing agents useful for polyamide resins in both solid ink and solid imaging materials are a diurethane monoamide, a diurethane tri-amide, a diurethane tetra-amide and combinations thereof.

The following examples of the synthesis of urethane tetra-amides and solid imaging material are presented to illustrate the scope of the invention and to be illustrative of solid imaging materials, as well as phase change ink formulations, that can be employed successfully using a urethane tetra-amide, without any intent to limit the invention to the specific materials, process or structure employed.

In the following examples, the synthesis of urethane tetra-amide was performed in a glass kettle equipped with heating metal, temperature controller, mechanical stirrer, water condenser and nitrogen gas inlet. The completeness of the reactions was followed by using a Model 1760 FTIR Spectrophotometer available commercially from Perkin-Elmer of Norwalk, CT. The UV-Visible spectra of the products were recorded using a Shimazu Model UV-1201 spectrophotometer. The melting point of the products were determined using a Model DSC 550 differential scanning calorimeter available commercially from Instrument Specialist Incorporated. The viscosity of the obtained products was measured using a high temperature Brookfield Model DV-II+viscometer.

EXAMPLE 1

About 300 grams of 12-hydroxystearic acid available commercially from CasChem of Bayonne, N.J., about 286 grams of stearic acid available commercially from Adrich Chemicals of Milwaukee, Wis., and about 61 grams of ethylenediamine commercially available from Aldrich Chemicals were added and stirred into the mixture in the reaction kettle. The reaction was heated to about 110° C. for two hours. The reaction temperature was increased to about 180° C. for an additional two hours. The reaction temperature was decreased to about 80° C. About 84 grams of 1,6-dicyanatohexane commercially available as Desmodur H from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid product was obtained having a melting point at about 45° C. and viscosity of about 61.8 cPs at 150° C.

EXAMPLE 2

About 300 grams of 12-hydroxystearic acid available commercially from CasChem of Bayonne, N.J., about 286 grams of stearic acid available commercially from Adrich Chemicals of Milwaukee, Wisconsin, and about 61 grams of ethylenediamine commercially available from Aldrich Chemicals were added and stirred into the mixture in the reaction kettle. The reaction was heated to about 110° C. for two hours. The reaction temperature was increased to about 180° C. for an additional two hours. The reaction temperature was decreased to about 80° C. About 111 grams of isophorone diisocyanate commercially available as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid product was obtained having a melting point at about 133° C. and viscosity of about 87.1 cPs at 150° C.

EXAMPLE 3

About 300 grams of 12-hydroxystearic acid available commercially from CasChem of Bayonne, N.J., about 286 grams of stearic acid available commercially from Adrich Chemicals of Milwaukee, Wis., and about 61 grams of ethylenediamine commercially available from Aldrich Chemicals were added and stirred into the mixture in the reaction kettle. The reaction was heated to about 110° C. for two hours. The reaction temperature was increased to about 180° C. for an additional two hours. The reaction temperature was decreased to about 80° C. About 125 grams of 4,4-methylene bis(phenylisocyanate) commercially available as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid product was obtained having a melting point at about 132° C. and viscosity of about 156 cPs at 150° C.

EXAMPLE 4

About 300 grams of 12-hydroxystearic acid available commercially from CasChem of Bayonne, N.J., about 286 grams of stearic acid available commercially from Adrich Chemicals of Milwaukee, Wis., and about 74 grams of 1,3-propylenediamine also available commercially from Aldrich Chemicals were added into the reaction kettle. The reaction was heated to about 110° C. for two hours then increased to about 180° C. for an additional two hours. The reaction temperature was decreased to about 80° C. About 111 grams of isophorone diisocyanate available commercially as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid product was obtained having a melting point at about 64° C. and viscosity of about 274 cPs at about 135° C.

EXAMPLE 5

About 300 grams of 12-hydroxystearic acid available commercially from CasChem of Bayonne, N.J., about 286 grams of stearic acid available commercially from Adrich Chemicals of Milwaukee, Wis., and about 190 grams of 2-butyl-2-ethyl-1,5-pentylenediamine also available commercially from Aldrich Chemicals were added into the reaction kettle. The reaction was heated to about 110° C. for two hours and then increased to about 180° C. for an additional two hours. The reaction temperature was decreased to about 80° C. About 111 grams of isophorone diisocyanate available commercially as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid product was obtained having a melting point at about 46° C. and viscosity of about 267 cPs at about 135° C.

EXAMPLE 6

About 300 grams of 12-hydroxystearic acid available commercially from CasChem of Bayonne, N.J., about 286 grams of stearic acid available commercially from Aldrich Chemicals of Milwaukee, Wis., and about 114 grams of 1,2-diaminocyclohexane also available commercially from Aldrich Chemicals were added into the reaction kettle. The reaction was heated to about 110° C. for two hours then increased to about 180° C. for an additional two hours. The reaction temperature was decreased to about 80° C. Then, about 111 grams of isophorone diisocyanate commercially available as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid diurethane tetra-amide product was obtained having a melting point at about 51° C. and viscosity of about 155 cPs at about 135° C.

EXAMPLE 7

About 300 grams of 12-hydroxystearic acid available commercially from CasChem of Bayonne, N.J., about 286 grams of stearic acid available commercially from Adrich Chemicals of Milwaukee, Wis., and about 61 grams of ethylenediamine also available commercially from Aldrich Chemicals were added into the reaction kettle. The reaction was heated to about 110° C. for two hours then increased to about 180° C. for an additional two hours. The reaction temperature was decreased to about 80° C. About 552 grams of 12-hydroxystearyl-stearylamide available commercially from American Dye Source of Montreal, Canada, was added. Then, about 222 grams of isophorone diisocyanate commercially available as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid diurethane tri-amide product was obtained having a melting point at about 64° C. and viscosity of about 92 cPs at about 135° C.

EXAMPLE 8

About 300 grams of 12-hydroxystearic acid available commercially from CasChem of Bayonne, N.J., about 286 grams of stearic acid available commercially from Adrich Chemicals of Milwaukee, Wis., and about 61 grams of ethylenediamine also available commercially from Aldrich Chemicals were added into the reaction kettle. The reaction was heated to about 110° C. for two hours then increased to about 180° C. for an additional two hours. The reaction temperature was decreased to about 80° C. About 342 grams of 2-hydroxyethylstearylamide available commercially from American Dye Source of Montreal, Canada, was added. Then, about 222 grams of isophorone diisocyanate commercially available as Desmodur I from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid diurethane tri-amide product was obtained having a melting point at about 170° C. and viscosity of about 39.3 cPs at about 135° C.

EXAMPLE 9

About 363 grams of 2-hydroxyethyl 12'-hydroxy stearamide available commercially as Paracin 220 from CasChem of Bayonne, N.J., was heated to about 60° C. About 591 grams of 1-octadecylisocyanate commercially available from Bayer Corporation of Pittsburgh, Pa., and about 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid diurethane mono-amide product was obtained having a melting point at about 90° C. and viscosity of about 14.5 cPs at about 135° C.

EXAMPLE 10

About 342 grams of monoamide S acid available commercially from Mona Industry of Patterson, N.J., was heated to about 60° C. About 295 grams of 1-octadecylisocyanate commercially available from Bayer Corporation of Pittsburgh, Pa., and 0.1 grams of dibutyltin dilaurate also commercially available from Aldrich Chemicals were then added into the reaction mixture. The temperature of the reaction was raised to about 140° C. and stirred for two hours. After being cooled to room temperature, a translucent tan solid monourethane mono-amide product was obtained having a viscosity of about 9.4 cPs at about 135° C.

EXAMPLE 11

Solid Imaging Material Formulation Using Solubilizing Agent. In a 200 ml glass beaker about 51 grams of hexadecyl, octadecyl carbamate, available from ADS of Montreal, Canada; about 8 grams of hexyl, octadecyl carbamate, also available from ADS of Montreal, Canada; about 20 grams of hexyl [3-({[(7-isopropyl-1,4a-dimethyltetradecahydro-1-phenanthrenyl)methoxy]carbonyl}amino)-1,4,4-trimethylcyclohexyl]methyl carbamate; about 14 grams of the translucent tan solid product obtained in Example 2; about 2.5 grams of Polyamide Resin 2942 available from Arizona Chemical; about 2.5 grams of Polyamide Resin 2614 available from Arizona Chemical; and about 2.0 grams of Irganox 1010 an anti-oxidant available commercially from Ciba Geigy were mixed together at a temperature of about 140° C. on a hot plate and then blended by stirring in a temperature controlled mantle at about 115° C. for about ½ hour. After stirring, the imaging material base was filtered through a 1 micron Pall filter available from Pall Filters of East Hills, N.Y. At a pressure of about five pounds per square inch, the filtered phase change material was poured into molds and allowed to solidify, forming disks of solid imaging material. The solid imaging material created employed the diurethane tetraamide from Example 2 as a solubilizing agent, a carbamate viscosity modifier, and a tackifier that yielded a tough, flexible formulation suitable for solid imaging materials. The material had a viscosity at about 135° C. of about 12.5 cPs. The Irganox 1010 anti-oxidant is used to suppress the thermal oxidation of the carbamate.

While the invention has been described above with reference to specific embodiments thereof, it is apparent that many changes, modifications and variations can be made without departing from the inventive concept disclosed herein. For example, it should be noted where a urethane polyamide reaction product is obtained, a single alcohol precursor of multiple alcohol precursors may be used with an appropriate isocyanate as long as the required stoichiometric ratio is maintained. Also, as exemplified in the Examples, hydroxy fatty acids may be used alone or in combination with fatty acids to produce a urethane polyamide reaction product. Appropriate fatty acids include stearic acid, decanoic acid, myristic acid and docasanoic acid. Accordingly, it is intended to embrace all such changes modifications and variation that fall within the spirit and broad scope of the appended claims. All patent applications, patents and other publications cited herein are incorporated by reference in their entirety.

What is claimed is:

1. A urethane polyamide useful in a solid imaging material jetted from a print head that is the reaction product of a hydroxy fatty acid reactant, a diamine selected from the group consisting of ethylenediamine; 1,3-propylenediamine; and 2-butyl-2-ethyl-1,5-pentylenediamine and a difunctional or a higher functional isocyanate.

2. The reaction product according to claim 1 further including use of an isocyanate reactant selected from the group consisting of a diisocyanate, a triisocyanate, a copolymer of a triisocyanate and a copolymer of a triisocyanate and combinations thereof.

3. The reaction product according to claim 2 further including use of a diisocyanate reactant that is selected from the group consisting of 1,6-dicyanatohexane, isophorone diisocyanate, and 4,4'-methylene bis(phenylisocyanate).

4. The reaction product according to claim 1 further including use of a fatty acid as a reactant.

5. The reaction product according to claim 1 wherein the hydroxy fatty acid is 12-hydroxy stearic acid.

6. The reaction product according to 4 wherein the hydroxy fatty acid is 12-hydroxy stearic acid and the fatty acid is selected from the group consisting of stearic acid, decanoic acid, myristic acid, and docasanoic acid.

* * * * *